United States Patent
Riendeau et al.

(10) Patent No.: US 10,041,746 B2
(45) Date of Patent: Aug. 7, 2018

(54) ENTHALPY EXCHANGER ELEMENT AND METHOD FOR THE PRODUCTION

(71) Applicant: Zehnder Group International AG

(72) Inventors: Marcel Riendeau, Lich (DE); Christian Hirsch, Eibenstock (DE); Erhard Krumpholz, Zurich (CH)

(73) Assignee: Zehnder Group International AG, Granichen (CH)

( * ) Notice: Subject to any disclaimer, the term of this patent is extended or adjusted under 35 U.S.C. 154(b) by 16 days.

(21) Appl. No.: 14/906,720

(22) PCT Filed: Jul. 17, 2014

(86) PCT No.: PCT/IB2014/001355
§ 371 (c)(1),
(2) Date: Jan. 21, 2016

(87) PCT Pub. No.: WO2015/011543
PCT Pub. Date: Jan. 29, 2015

(65) Prior Publication Data
US 2016/0178288 A1   Jun. 23, 2016

(30) Foreign Application Priority Data
Jul. 22, 2013 (EP) .................................... 13003673

(51) Int. Cl.
*B23P 15/26* (2006.01)
*F28F 3/02* (2006.01)
(Continued)

(52) U.S. Cl.
CPC .............. *F28F 3/025* (2013.01); *B23P 15/26* (2013.01); *F28D 21/0015* (2013.01); *F28F 21/066* (2013.01)

(58) Field of Classification Search
CPC .. F24F 4/1417; F24F 2003/1435; F24F 3/147; B21D 28/26; B21D 28/265
See application file for complete search history.

(56) References Cited

U.S. PATENT DOCUMENTS 6,951,242 B1 * 10/2005 Des Champs .......... F24F 3/147
165/133
6,953,510 B1 * 10/2005 Mackay .................. B29C 55/18
156/160

(Continued)

FOREIGN PATENT DOCUMENTS

CA         2826995 A1    8/2012
CA         2798892 A1    7/2013
(Continued)

*Primary Examiner* — Jason L Vaughan
(74) *Attorney, Agent, or Firm* — Maxwell L. Minch; GrayRobinson, P.A.

(57) ABSTRACT

Enthalpy exchanger elements which allow the creation of enthalpy exchangers whereby the efficiency of sensible energy exchange and latent energy exchange can be varied and controlled and especially improved. Also, a method for the production of enthalpy exchanger elements including: •a) perforating a flat plate element (1) according to a predetermined perforation pattern (2, 2, . . . ) within the plate outer dimensions, or providing a plate element (1) with an inherent pore structure; •b) applying to at least one side (1a) of the plate element (1) a thin polymer film (3) with water vapor transmission characteristics; •c) forming the plate element (1) into a desired shape exhibiting a corrugation pattern (4, 4, . . . ), whereby the polymer film (3) is formed into the same corrugation pattern shape as that of the plate element (1).

15 Claims, 1 Drawing Sheet

(51) Int. Cl.
  *F28F 21/06* (2006.01)
  *F28D 21/00* (2006.01)

(56) References Cited

U.S. PATENT DOCUMENTS

| | | | | |
|---|---|---|---|---|
| 7,572,321 | B2* | 8/2009 | Yamakawa | B01D 67/0009 |
| | | | | 165/60 |
| 8,936,668 | B2* | 1/2015 | Huizing | B01D 53/228 |
| | | | | 165/10 |
| 9,216,405 | B1* | 12/2015 | Tan | B01J 20/264 |
| 9,429,366 | B2* | 8/2016 | Dubois | B01D 53/228 |
| 9,562,726 | B1* | 2/2017 | Eplee | F28D 21/0015 |
| 2003/0012676 | A1* | 1/2003 | Quick | B01D 39/2044 |
| | | | | 419/4 |
| 2003/0056884 | A1* | 3/2003 | Belding | B01J 20/103 |
| | | | | 156/205 |
| 2003/0106680 | A1* | 6/2003 | Serpico | B01D 53/268 |
| | | | | 165/166 |
| 2009/0314480 | A1* | 12/2009 | Grinbergs | F24F 3/1411 |
| | | | | 165/174 |
| 2010/0032145 | A1* | 2/2010 | Lee | F24F 3/147 |
| | | | | 165/133 |
| 2010/0247404 | A1* | 9/2010 | Ptak | B01D 46/10 |
| | | | | 422/187 |
| 2011/0259572 | A1* | 10/2011 | Muratani | B29C 45/0055 |
| | | | | 165/185 |
| 2012/0073791 | A1 | 3/2012 | DuBois | |
| 2013/0299121 | A1* | 11/2013 | Ahn | D01D 5/0015 |
| | | | | 165/8 |
| 2014/0014289 | A1* | 1/2014 | Tan | F28D 9/0025 |
| | | | | 165/10 |
| 2014/0262125 | A1* | 9/2014 | Erb | F28D 9/0062 |
| | | | | 165/10 |

FOREIGN PATENT DOCUMENTS

| | | |
|---|---|---|
| DE | 3430204 A1 | 2/1986 |
| EP | 3022508 | 3/2017 |
| WO | 2001027552 A1 | 4/2001 |
| WO | 2002072242 A1 | 9/2002 |
| WO | 2013091099 A1 | 6/2013 |

* cited by examiner

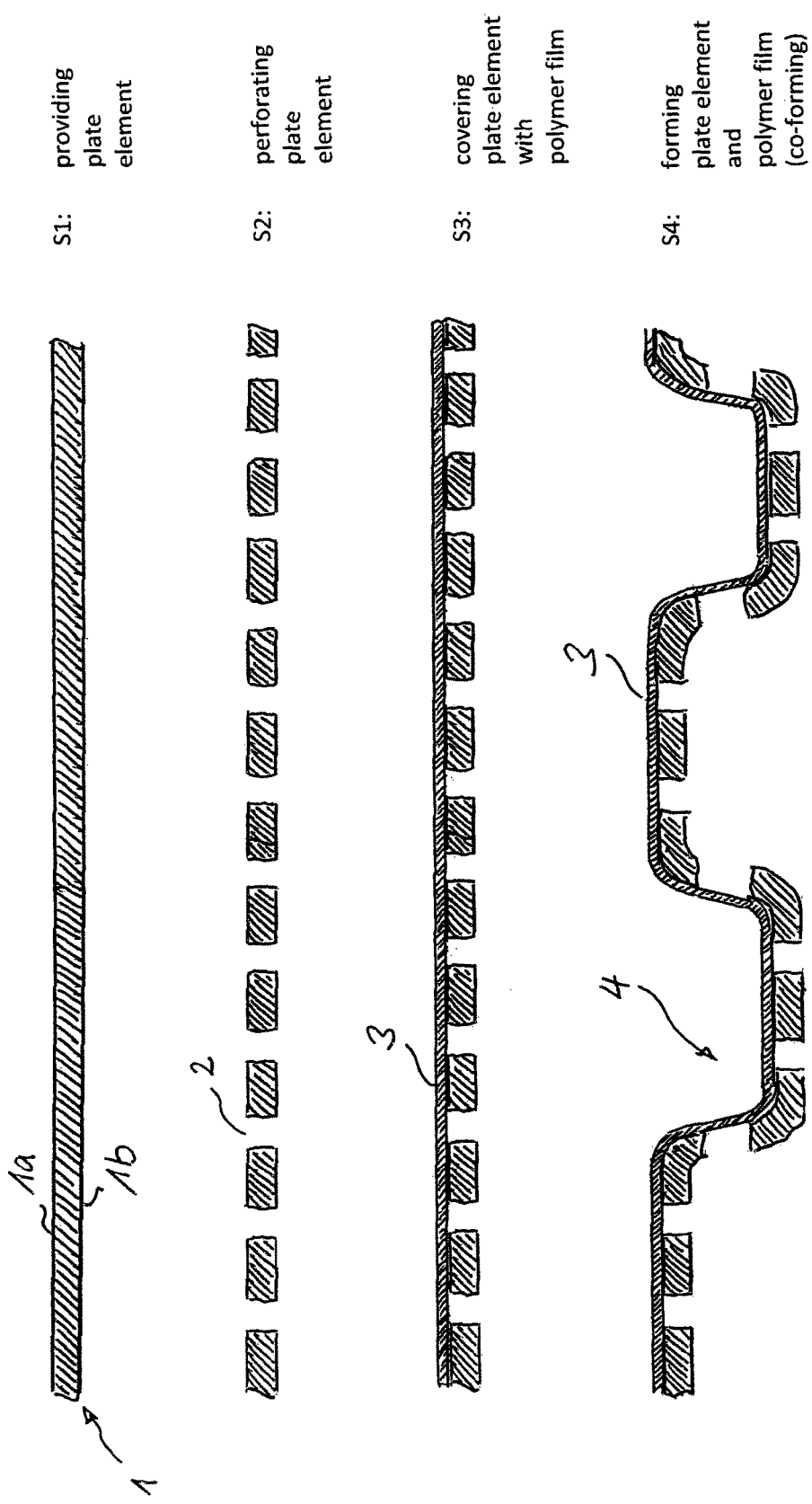

ENTHALPY EXCHANGER ELEMENT AND METHOD FOR THE PRODUCTION

The present invention refers to enthalpy exchanger elements. Furthermore, the invention discloses a method for the production of enthalpy exchanger elements. Finally, the invention refers to an enthalpy exchanger including inventive enthalpy exchanger elements.

It is state of the art to use different kinds of heat exchangers for different purposes. Usually, heat exchangers are used to recover heat energy from one fluid or medium into another one. This kind of heat energy is called sensible energy. The heat energy or sensible energy of one fluid, normally air, is recovered into another one which is running adjacent, e.g. parallel, counter or cross flow, to the first where the fluid is at lower temperature. By inversing fluid flows, the exchange between the two will generate a cooler fluid. Heat exchangers used for sensible energy recovery are usually made of metal or plastic plates. There are different types as there can be cross flow, parallel flow or counter flow configurations. The plates are defining flow channels between themselves so that the fluids can flow between the plates. Such devices are e.g. used in residential and commercial ventilation (HRV).

Another type of energy exchangers refers to the so called latent energy which is the moisture. To exchange the latent energy it is known to use desiccant coated metal or plastic substrates or membranes made from desiccant impregnated cellulose or polymer. Between plates made from cellulose or polymer, air passages are defined or created to allow the fluids to pass along the surface of the plates, thereby transferring moisture from one fluid to the other one. As the membranes usually have no structural strength, it is known to combine the membranes with frames or grids which thereby define spacings between the membranes.

In case of a combination of the above, the energy exchangers are called Enthalpy exchanger. Those Enthalpy exchangers allow for the exchange of sensible and latent energy, resulting in Total Energy recovery.

Membrane materials as currently available are delivered by the roll. The membrane material is the most critical part of an Enthalpy exchanger. The membrane must be fixed and sealed to a kind of grid or frame and arranged in a way to allow for a fluid to flow between each membrane layer. So, it is obvious that Enthalpy exchangers of the known art are a compromise. They will usually lose in sensible energy exchange to gain in latent energy exchange as a result of the selective scope and characteristics of currently used membranes.

Such an enthalpy exchanger built from respective elements is e.g. WO 02/072242 A1. On grids respective membranes made of fibers are positioned. The grids are stapled or stacked thereby altering the direction of the plates in order to create different air flow directions.

In view of the mentioned state of the art it is an object of the invention to provide enthalpy exchanger elements and enthalpy exchangers as well as a method for the production of enthalpy exchanger elements which allow for the creation of Enthalpy exchangers whereby the efficiency of sensible energy exchange and latent energy exchange can be varied and controlled and especially improved.

With the invention, the solution of the above mentioned object is presented by a method for the production of enthalpy exchanger elements comprising the steps of:

a) perforating a flat plate element according to a predetermined perforation pattern within the plate outer dimensions, or providing a plate element with an inherent pore structure;
b) applying to at least one side of the plate element a thin polymer film with water vapor transmission characteristics (water vapor transfer ratio, WVTR);
c) forming the plate element into a desired shape exhibiting a corrugation pattern, whereby the polymer film is formed into the same corrugation pattern shape as that of the plate element.

Preferably, in the method according to the invention, the plate element is a plastic plate.

The plate may be perforated using at least one of needles, pins, die and punch, laser, or the like.

Alternatively, instead of perforating a plastic plate element in step a) with some of these perforating tools, a plate element with an inherent pore structure may be provided. Such a plate element may comprise a porous polymer plate or a woven or non-woven fabric made from polymer fibers, inorganic fibers or metal fibers. Preferably, the plate element is a composite comprising a woven or non-woven fabric made from polymer fibers, inorganic fibers or metal fibers on the one hand and a porous polymeric material as a matrix on the other hand. It is to be understood that the plate element with the inherent pore structure is not necessarily selectively permeable for small molecules.

Preferably, the border areas of the plate element are not perforated, preferably in a range of 5 to 20 mm, more preferably in a range of 10 to 20 mm, from the outer dimensions of the plate element.

Preferably, in the method according to the invention, step b) of applying to at least one side of the plate element a thin polymer film with water vapor transmission characteristics (water vapor transfer ratio, WVTR) and step c) of forming the plate element into a desired shape exhibiting a corrugation pattern, whereby the polymer film is formed into the same corrugation pattern shape as that of the plate element, are performed simultaneously. This allows standard thermoforming, preferably vacuum forming, to be used for shaping the two-layer structure comprising the plastic support and the thin polymer film.

The polymer film may be bonded, preferably heat bonded and/or glued, to the plate element during the forming step of the plate element.

The polymer film may be made of a sulfonated copolymer, preferably a block copolymer.

Advantageously, in the method according to the invention, the spatial frequency of any corrugations running in parallel within the corrugation pattern and/or the perforation density (i.e. number of perforations per unit area) is varied, preferably in border areas, to improve frost resistance.

With the invention, the solution of the above mentioned object is presented by an Enthalpy exchanger element, preferably produced according to the method as defined in the previous paragraphs, including a plate element with a shape exhibiting predetermined perforation and corrugation patterns, wherein at least one side of the plate element is covered by a thin polymer film with water vapor transmission characteristics (water vapor transfer ratio, WVTR).

In the enthalpy exchanger element according to the invention, the thin polymer film may be bonded, preferably heat bonded and/or glued, to the plate element.

Preferably, the perforated area of the plate element includes corrugated or embossed surface areas.

Preferably, the width of corrugations in the border areas of the plate element is larger than the width of corrugations in the middle area of the plate element and/or the perforation density (i.e. number of perforations per unit area) in a border area of the plate element is larger than in the middle area of the plate element.

Preferably, the plate element has a border which allows gastight connection to another similar plate element. This border preferably has border areas where the plate element is not perforated, preferably in a range of 5 to 20 mm, more preferably in a range of 10 to 20 mm, from the outer dimensions of the plate element.

Preferably, the corrugations are oriented to guide a fluid flow.

The perforations may be openings of diverse shapes and with a surface area equivalent to hole diameters ranging from 30 μm to 1.2 mm, preferably providing a total open area of no less than 50% of the available plate exchange surface.

With the invention, the solution of the above mentioned object is presented by an Enthalpy exchanger with at least three plates like enthalpy exchanger elements fixed to each other in parallel orientation to form two fluid paths allowing fluids to flow there through, characterized in that the plate like heat exchanger elements are elements as defined in the previous paragraphs.

Preferably, the enthalpy exchanger elements are fixed to each other by means of welding such as laser welding or ultrasonic welding, or by means of gluing.

According to the invention, a new hybrid exchanger element is provided which on one hand has enough structural strength and density to create air flow channels for any type of cross flow and/or counter flow energy exchanger, thereby allowing for the use of a structurally strong material which is good for sensible energy exchange, on the other hand by size and number of perforations or openings or holes it is possible to define an area which is covered by a thin polymer film with latent energy exchange characteristics. It will be appreciated by a person skilled in the art that the efficiency of sensible energy exchange on one hand and latent energy exchange on the other hand can be defined, controlled and adapted to the respective needs of the environment (dry air, humidity, outside temperature and the like).

According to the invention, the plate element can be made of any plastic material. The element can be provided with corrugations. Corrugations can be designed to optimize the efficiency to pressure drop ratio. The corrugations can be chosen to allow for creating flow channels between similar plates when those are stacked together. By the definition of the corrugation, one advantage will be the enhancement of the surface which is available for energy transfer. This can be built up as large as possible and can even reach an increase of 100% and more. Furthermore, the corrugations can be designed in a way to allow for the easy arrangement of counter flow or cross flow configurations, e.g. by choosing oriented corrugations and alternating the position of the plate.

The border of the plate defines an area where similar plates can be fixed together in an appropriate way. This can be welding, e.g. laser welding, ultra sound welding and/or folding, hot crimping and the like. This stabilizes the rigidity of the package as well as allows to build up the desired flow channels. The border area can be flattened, tongue/groove system, profiled or rimmed to allow for a tight sealable connection between plates.

The perforations can advantageously be performed prior to the plate forming step, which allows for a fast and convenient perforation step. That way plates can be perforated more easily and furthermore perforated in any desired area.

The thin polymer film can be made of a polymer according to the state of the art, e.g. like the product "Aquivion", a trademark of Solvay or "Nexar", a trademark of Kraton.

The material can be e.g. a ionomer in form of a copolymer produced from tetrafluoroethylene, $C_2F_4$, and Ethanesulfonyl fluoride, 1,1,2,2-tetrafluoro-2-[(trifluoroethenyl)-oxy], $C_2F_3$—O—$(CF_2)_2$—$SO_2F$, sulfonated block copolymer.

The thin polymer film may be a multilayer film comprising a sequence of polymer layers of different polymer types. Preferably, the polymer type of each polymer layer is selected from the group consisting of polyether ester, polyether amide and polyether urethane. Preferably the total thickness of the thin polymer multilayer film is between 5 μm and 200 μm, more preferably between 10 μm and 150 μm. Preferably, the thickness of each individual polymer layer within the thin polymer multilayer film is between 2 μm and 20 μm, more preferably between 5 μm and 20 μm.

However, the polymers can be adapted to the desired characteristic and features.

It will be appreciated by a person skilled in the art that the amount or efficiency of latent energy recovery depends on the surface provided by the holes or perforations, their shapes and their locations. So it is possible to adapt the heat exchanger plates to the environmental and functional conditions.

By using the highly heat conductive materials as the structural elements for the Enthalpy membrane, high sensible efficiency is ensured. By defining the perforations and choosing the polymer for water vapor transfer, high latent recovery is ensured. Preferably, a total "open area" for water vapor transfer of no less than 50% of the available plate exchange surface is provided.

The polymer can be combined with additives to manifold and magnify its attributes. It can be, for instance, efficiently anti-bacterial and can meet fire resistance requirements (UL). Its viscosity can be adjusted to achieve the optimal tunable exchange features of the plate allowing as high a moisture exchange as possible.

The polymer film may be applied to one side of the plate element prior to the forming step of said plate element, thereby completely covering the plate element as well as the holes or perforations. Therefore the perforations are not limited in size and can be chosen in any desired dimension.

Subsequently to applying the polymer film to the plate element, the plate element is formed to exhibit the aforementioned features, e.g. corrugations, side walls, flat border areas and the like. The polymer film is formed into the same shape as the plate element and can be permanently bonded or glued to said plate element. The bonding or gluing may be performed with or without heating.

According to an alternate embodiment of the inventions, the perforations are not permanently covered and sealed by a polymer film, but rather filled with a polymer solution, which can be the same material as the polymer film, and subsequently cured. The polymer may be supplied in a dispersed or dissolved state. The dispersion or solution comprising the polymer can be brought to the plate by thereby filling or covering the holes or perforations with the polymer dispersion or solution by way of spraying, dipping, serigraphy or any other lamination method. In order to maintain the same perforation characteristics, one side of the flat plate element may be completely covered by a liner (placeholder-film), which does not bond to the plate element during the forming step and can easily be removed after the forming step. Subsequently to removing the liner (placeholder-film) the perforation holes can be filled with the polymer solution, as described above.

It will be appreciated by a person skilled in the art that the sensible energy transfer and the latent energy transfer capabilities of the heat exchanger are tunable and adjustable. The plates are adaptable to environmental conditions by the variable mosaic geometry of the perforations. E.g. an exchanger can be designed to operate at a temperature under the freezing point (−10° C.) without ice build-up only by choosing the right position of the perforations and polymeric treatment of the constitutive plates.

However, under harsh conditions, especially plate exchangers tend to build ice in the narrow border channels, thus decreasing the exchange efficiency of the plate exchanger. This is due to a reduced flow velocity of fluids in said border channels.

In order to overcome this issue, the width of corrugations in the border area of the plate element is larger compared to the width of the corrugations in the middle area of the plate element. Thus, the width of the resulting flow channels in the border area is increased and as a result the flow velocity of the fluid is increased, thus preventing or at least delaying ice from building up.

The rigidity of the structural elements could make the plate and thereby the polymer film capable of handling a pressure differential up to 1 kPa within the exchanger. This advantage opens the door to larger exchanger constructions for commercial applications.

The invention provides a simple method for the production of total energy exchanger plates allowing sensible as well as latent energy exchange. The design and the adaptability of the plates allows for the construction and design of plate exchangers which are optimized with regard to the technical requirements and/or the environmental conditions.

Stamped, corrugated or embossed aluminum, stainless steel, resin based plates and/or vacuum formed plastic plates can be made using proven automation technologies including the assembly, e.g. by vacuum grip, and seal, e.g. by laser welding, ultra sound welding, folding, crimping, to obtain packages of superposed rigid plates. The plates are washable, fire retardant, antibacterial, sealed e.g. leakage proof. They have all valuable advantages that are necessary to create highly efficient total energy exchangers.

The plate perforation, too, can be performed by pre-programmed continuous laser processes, by mechanical systems like needle-roller and the like, or chemical etching processes.

Further features, advantages and aspects of the invention become obvious from the following description of the drawings. The drawings show:

FIG. 1 a flow chart illustrating a sequence of steps of the production method according to the invention; and FIG. 2 a sequence of states of the production of an enthalpy exchanger element in cross sectional view during the production method according to the invention.

In FIG. 1, a sequence of steps of the production method according to the invention are shown. Each step shown in FIG. 1 corresponds to a resulting state schematically shown in FIG. 2. It should be noted that the illustrated geometric parameters such a thicknesses, hole diameters, curvatures etc. in FIG. 2 are for exemplary purposes, only. Therefore, they do not necessarily represent the proper or preferred ratios of such parameters.

In providing step S1, a flat yet unformed plastic plate element 1 with defined outer dimensions is provided. In perforating step S2, a portion of the flat plastic plate element 1 is transferred to a perforation device (not shown) where the flat plastic plate element 1 is perforated by a needle-roller or a punching die (not shown) depending on the desired size of the holes. In the present case, the entire plate element 1 is perforated with a symmetric hole pattern, except for the border areas (not shown) to allow welding of the plate elements 1 in order to form the plate exchanger (not shown). The perforation pattern is made up of a plurality of holes 2 extending across the entire plate thickness from a first surface 1a to a second surface 1b of the plate element 1.

Subsequently to the perforating step, in covering step S3, one side, i.e. surface 1a, of the now perforated plate element 1 is completely covered by a thin polymer film 3. The polymer film is made of a proprietary sulfonated block copolymer or any type of such sulfonated block copolymers.

Subsequently to the covering step, in forming step S4, the now perforated and covered flat plate element 1 is transferred to a forming device, which is embodied by a vacuum forming device, where the flat plate element 1 and the thin polymer film 3 are formed into a desired shape. In this forming step S4, the border areas, fluid inlets and outlets and corrugations 4 are formed into the plate element 1. The corrugation pattern is made up of a plurality of corrugations 4 extending across the plate area.

In the present embodiment of the invention, the border areas are being formed in non-perforated areas, while the corrugations are being formed in perforated areas of the plate element 1.

Thereby, during the forming step S4 which is a co-forming step of the flat plate element 1 and the thin polymer film 3, the thin polymer film 3 is formed into the exact same shape as the plate element 1 and is permanently bonded thereto, due to the heat, which is applied by the vacuum forming device.

These thin-polymer-film-covered and co-formed plates 1 constitute the enthalpy exchanger plates according to the invention. They will be stacked to build an enthalpy exchanger (also referred to as a total energy exchanger) core e.g. for ventilation systems to exchange heat from outgoing to incoming air (or vice versa for free cooling in summer) as well as humidity from outgoing to incoming air in winter (or vice versa for moisture reduction in summer or all year round in hot and humid climatic zones).

The cross sectional shape of the corrugations 4 may be rectangular, square or triangular. It may also be trapezoidal such half hexagonal.

The drawing and the description do in no way restrict the invention and are meant for illustrating the invention by an example, only.

REFERENCE NUMERALS 1 flat plate element
1a first surface
1b second surface
2 hole
3 thin polymer film
4 corrugation
S1 providing step
S2 perforating step
S3 covering step
S4 forming step (co-forming)

The invention claimed is:

1. A method for the production of enthalpy exchanger elements, the method comprising:
 a) perforating a flat plate element (1) according to a predetermined perforation pattern (2, 2, . . . ) within the plate outer dimensions, or providing a plate element (1) with an inherent pore structure;

b) applying to at least one side (1a) of the plate element (1) a thin polymer film (3) with water vapor transmission characteristics (water vapor transfer ratio, WVTR);

c) forming the plate element (1) into a desired shape exhibiting a corrugation pattern (4, 4, . . . ), whereby the polymer film (3) is formed into the same corrugation pattern shape as that of the plate element (1); and whereby the plate element is a plastic plate and whereby a total open area for water vapor transfer on no less than 50% of the available plate exchange surface is provided; and wherein the polymer film is heat bonded or glued to the plate element while the plate element is being formed into the desired shape.

2. The method according to claim 1, characterized in that the plate is perforated using at least one of needles, pins, die and punch, or a laser.

3. The method according to claim 1 wherein the polymer film is made of a sulfonated copolymer, or a block copolymer.

4. The method according to claim 1 wherein the spatial frequency of the corrugations of the corrugation pattern and the density of the perforations in the perforation pattern is varied in a border area of the corrugation pattern and a border area of the perforation pattern in order to improve frost resistance.

5. The method of claim 1 whereby the plate element is a plastic plate providing a plate exchange surface and whereby a total open area for water vapor transfer of no less than 50% of the available plate exchange surface is provided.

6. The method of claim 1 wherein the plate element may comprise a porous polymer plate or a woven or non-woven fabric made from polymer fibers, inorganic fibers or metal fibers.

7. The method of claim 1 wherein the plate element is a composite made using a woven or non-woven fabric made from polymer fibers, inorganic fibers or metal fibers.

8. The method of claim 7 wherein the composite further includes a porous polymeric material as a matrix.

9. The method of claim 1 wherein the border areas of the plate element are not perforated, preferably in a range of 5 to 20 mm, more preferably in a range of 10 to 20 mm, from the outer dimensions of the plate element.

10. The method of claim 1 wherein the perforations may be openings of diverse shapes and with a surface area equivalent to hole diameters ranging from 30 µm to 1.2 mm, preferably providing a total open area of no less than 50% of the available plate exchange surface area.

11. The method of claim 1 wherein thin polymer film is a multilayer film further comprising a sequence of polymer layers of different polymer types.

12. The method of claim 11 wherein the polymer type of each polymer layer is selected from the group consisting of polyether ester, polyether amide and polyether urethane.

13. The method of claim 11 wherein the total thickness of the thin polymer multilayer film is between 5 µm and 200 µm or between 10 µm and 150 µm.

14. The method of claim 11 wherein the thickness of each individual polymer layer within the thin polymer multilayer film is between 2 µm and 20 µm, or between 5 µm and 20 µm.

15. A method for the production of enthalpy exchanger elements, the method comprising:

a) perforating a flat plate element (1) according to a predetermined perforation pattern (2, 2, . . . ) within the plate outer dimensions, or providing a plate element (1) with an inherent pore structure;

b) applying to at least one side (1a) of the plate element (1) a thin polymer film (3) with water vapor transmission characteristics (water vapor transfer ratio, WVTR);

c) forming the plate element (1) into a desired shape exhibiting a corrugation pattern (4, 4, . . . ), whereby the polymer film (3) is formed into the same corrugation pattern shape as that of the plate element (1); and wherein the applying to at least one side (1a) of the plate element (1) a thin polymer film (3) with water vapor transmission characteristics is accomplished by co-forming the plate element (1) and the thin polymer film (3) into a desired shape exhibiting a corrugation pattern (4, 4, . . . ), whereby the polymer film (3) is formed into the same corrugation pattern shape as that of the plate element (1) and is permanently bonded to the plate element during the forming of the corrugation pattern shape;

whereby the plate element is a plastic plate and whereby a total open area for water vapor transfer on no less than 50% of the available plate exchange surface is provided.

\* \* \* \* \*